Figure 1:
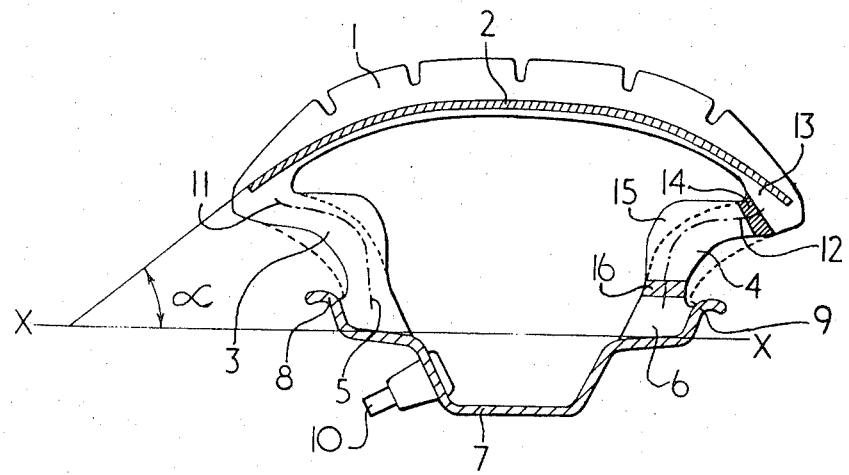

United States Patent [19]

Tangorra

[11] 3,805,868
[45] Apr. 23, 1974

[54] PNEUMATIC TIRE
[75] Inventor: Giorgio Tangorra, Milan, Italy
[73] Assignee: Industries Pirelli S.p.A., Milan, Italy
[22] Filed: July 19, 1972
[21] Appl. No.: 273,337

[30] Foreign Application Priority Data
July 30, 1971 Italy.................................. 83673/71

[52] U.S. Cl................ 152/353, 152/355, 152/357, 152/361 R
[51] Int. Cl...... B60c 13/00, B60c 17/00, B60c 9/02
[58] Field of Search........................... 152/352–355, 152/357, 361

[56] References Cited
UNITED STATES PATENTS
3,394,751  7/1968  Sidles et al.......................... 152/352
2,990,869  7/1961  Riley................................... 152/352
3,450,182  6/1969  Verdier............................... 152/352
3,253,636  5/1966  Travers............................... 152/354
3,464,477  9/1969  Verdier............................... 152/353
3,480,065  11/1969 Verdier............................... 152/353

Primary Examiner—Drayton E. Hoffman
Attorney, Agent, or Firm—Stevens, Davis, Miller & Mosher

[57] ABSTRACT

The invention relates to pneumatic tires of the type having substantially radially inextensible tread band structures. According to this invention the tire sidewalls are convexly curved towards the tire midplane so that when the tire is pressurized said sidewalls are placed under compression rather than under tension.

16 Claims, 7 Drawing Figures

PNEUMATIC TIRE

The present invention relates to pneumatic tires for vehicle wheels, and more precisely it concerns a new tire structure which provides important advantages over conventional tires regarding production and operation.

It is known that conventional tires comprise a carcass constituted by a plurality of plies, whose cords are subjected to tension in consequence of inflation pressure being applied within the tire.

It is also known that, during the tire build-up, other components are added to the carcass plies, such as the bead cores about which the carcass plies are turned up, the tread band, the breaker positioned between the tread band and the carcass, and other reinforcements and fillers having particular functions. The resulting assembly is then shaped and at last cured in a mold.

It is evident that the manufacture of such a complicated structure cannot be mechanized beyond certain limits, so that, even today, manual operations in tire industry prevail over mechanized operations.

Processes are known for realizing tires devoid of carcass plies or breaker plies, and simply formed by pouring or injecting particular substances, such as synthetic resins or special rubbers into appropriate molds.

None of such processes, however, has given positive results owing to the inability of such substances to confer to the tire the necessary mechanical characteristics.

Other attempts made in order to simplify, at least partially, the tire construction, consist in eliminating the carcass plies and in maintaining only the breaker plies, so that the sidewalls of such tires are constituted by rubber only.

However these attempts seem not to have given satisfactory results.

In practice, all these attempts have been based on the concept of exploiting the property of rubber to withstand elastic compression stresses and bending stresses, and on the concept of utilizing the sidewalls of the tire, subjected to a very low inner pneumatic pressure, as elements cooperating in bearing the load. Therefore, the features of elasticity and of immediate reaction to deformations, characteristic of compressed gas inside the tire, have been seriously compromised, namely the advantages afforded by pneumatic tires (in their specific meaning) in which the elastic means is prevailingly compressed gas (air) existing in their inside, have been sacrificed.

The present invention seeks to provide a pneumatic tire which, for its particular structure, can be built up at least in part by means of the conventional processes of pouring, injection, or molding on a male, with all the consequent economical advantages, permitting the use of materials already experimented in the tire industry and offering at the same time unexpected characteristics in respect of behaviour (such as a very good comfort) and of uniformity of the produced article.

Accordingly, an object of the present invention is a pneumatic tire for vehicle wheels which comprises a reinforced tread and two sidewalls terminating in beads able to firmly fit in the edges of the rigid rim of the wheel, said tire comprising in section, in any plane containing the axis of the wheel, a tread having an axial width greater than that of any other part of the tire and incorporating an annular reinforcing structure which radially and axially is substantially inextensible and which defines, in proximity of the lateral edges of the tread, substantially inextensible contours whose points are at a substantially invariable radial distance, under the effect of pressure variations, from the points defined by the beads in the same sectional planes, and sidewalls comprising elastomeric material which have a high stiffness to bending and compression, in service conditions, in the interval between said points, and which show in said whole interval a section midline whose curvature is directed towards the tire midplane, said stiffness and the camber of said curvature being such that the curvature does not change in sense, under the effect of the outward lateral thrust due to the inflation pressure, by virtue of the compressive and bending reaction afforded by the material forming the sidewalls which, in consequence of said thrust directed outwardly and tending to straighten said sidewalls, remains constrained between the ends of said interval which react between said points at a substantially invariable distance.

It is moreover provided that each of the sidewalls comprises at least a zone having a bending stiffness, in the meridian plane, of a value lower than that of the analogous stiffness of the remaining zones.

In the present specification, the expression "bending stiffness" means the bending moment necessary to impart a unitary curvature variation at a certain point of the neutral axis of a specimen. In this description, for sake of simplicity, reference is made to a specimen reproducing the meridian section of the tire and having a unitary thickness measured in the direction of the parallels of the tire itself.

Preferably, the ratio between the bending stiffness at least at one of the low stiffness zones of each sidewall and the bending stiffness of the other zones of said sidewall does not exceed the value of 0.6 and is advantageously comprised between 0.6 and 0.01.

The zone of lower bending stiffness (when this is only one for each sidewall) can be situated at the end of the sidewall near the edge of the inextensible annular structure.

However, according to a preferred embodiment, the zones of lower bending stiffness comprised in each sidewall are two, namely one in proximity of the bead, in a radially outer position with respect to the rim flange of the associated wheel, and the other, at the radially outer portion of the sidewall, in proximity of the lateral end of said inextensible annular reinforcement.

Preferably, the different values of bending stiffness are obtained by imparting different thicknesses to the meridian section of each sidewall; however, it is possible to provide also the use of various materials having different moduli of elasticity, for instance, of a compound having a relatively low modulus at the zone of smaller stiffness and of a compound containing reinforcing fillers or other reinforcing materials, oriented, if desired, along a preferred direction, at the zone of greater stiffness.

In the present specification, the expression "modulus of elasticity" of a compound means the modulus of linear elasticity or Young modulus E, measured at 1/10 of the tensile strength of the compound, according to the known formula:

$$F/s = E(\Delta l/l)$$

where:

F is the load applied to the specimen s is the specimen section l is the initial length of the specimen $\Delta l$ is the deformation originated by load F.

In a further preferred embodiment, the inextensible annular reinforcement at least in proximity of its connection with each sidewall, has a curvature whose concavity is directed towards the tire inside.

Figure 2:
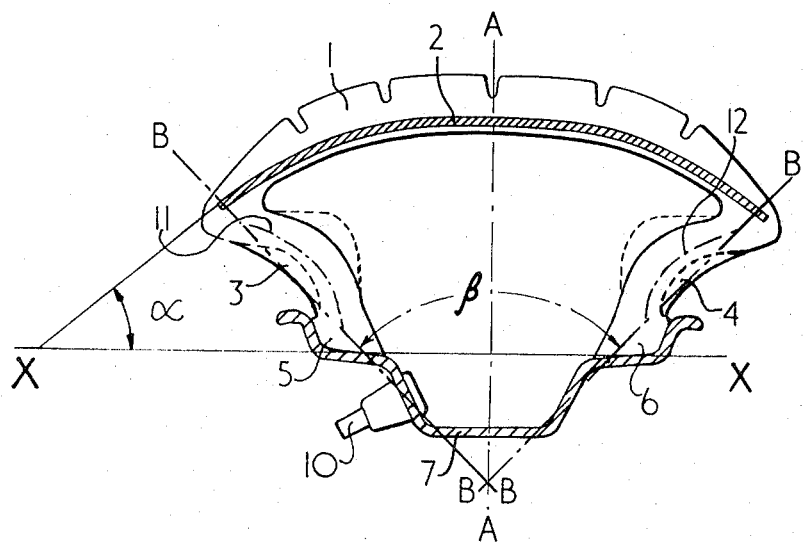

The invention will now be better illustrated with reference to the attached drawings, given by way of non-limiting example, in which:

FIGS. 1 and 2 are cross sections of the tire, respectively, not subjected and subjected to working pressure. In both figures the contour of the tire sidewalls in the two conditions is indicated in dotted lines to show the effects of the pneumatic pressure; and FIGS. 3 to 7 represent in scale some embodiments of the sidewalls of the tire according to FIG. 1.

FIG. 1 illustrates the cross section of a deflated tire, comprising a tread band 1, an annular reinforcing structure 2, two sidewalls 3 and 4, and two beads 5 and 6, which engage and firmly fit, in an already known way, in the shaped edges of a rim 7, having flanges 8 and 9, and provided with a normal valve 10 for the admission of the inflation air.

The annular reinforcing structure 2 can be of various conventional types; for instance, it can be of the type described in the Italian Pat. No. 869,165. Although said structure is radially flexible, especially at the central zone of the tread, it is however inextensible both in the direction of the meridians and in the direction of the parallels, namely in transversal and circumferential direction, respectively, when it is stressed by the inflation pressure.

Said reinforcing structure is not necessarily constituted by layers of cord fabrics, but also, for instance, by homogeneous material in the form of foils, having a resistance to tension sufficient to withstand the action of the inflation pressure and of the stresses originated during service.

The inextensible structure 2 extends axially for the whole upper part of the tire, concerning also the lateral zones of the tread, which are respectively connected with the sidewalls 3 and 4.

As is clearly visible in FIGS. 1 and 2, said lateral zones, together with the beads 5 and 6, define, in first approximation, the four vertices of an isosceles trapezium, whose larger base is adjacent to the tread, and coincides with the chord of the curvature of the section of the inextensible structure 2, and whose sides are defined by the sidewalls of the tire itself, not considering, in first approximation, their typical curved shape, seen in section, which will be described and commented hereinafter.

Since the annular structure 2, as said above, is inextensible, the distance between the two lateral ends of the annular structure and the flanges 8 and 9 of the rim 7 can be considered as substantially invariable, so that said lateral ends constitute fixed points, obviously in the absence of localized strong deforming stresses.

The tire illustrated by way of example in FIG. 1, which is intended to be fitted on a rim having flanges at an approximate distance of 90 mm from each other, has a maximum section width of about 150 mm, and the radial distance between the lateral ends of the inextensible structure 2 and the rim flanges is of the order of 30 mm; therefore, the sidewalls 3 and 4 of the tire converge (as indicated by the straight lines B—B in FIG. 2) in such a way that their prolongations cross with each other, forming an angle $\beta$ which in the example is of the order of 90°–95°. In the same tire, the section height is of the order of 70 mm and depends partially on the camber of the curvature of the inextensible structure 2 and of the tread 1, subjected to squeezing.

In the preferred embodiment illustrated in FIGS. 1 and 2, the annular reinforcement 2, at the zones of connection with the sidewalls 3 and 4, has a curvature whose concavity is directed towards the tire inside; the tangents to the profile of said structure in such zones of connection form with the horizontal axis XX, parallel to the axis of rotation of the tire, an angle $\alpha$ of 40°. Owing to the inextensibility of the reinforcement 2, said zones give rise to inextensible perimetral contours.

The sidewalls 3 and 4 have in cross section a particular curved shape, thickened at their center more than in their lateral zones, and the respective section midlines 11 and 12 in the meridian plane show a considerable convexity directed towards the tire inside.

By proceeding from the radially outermost portion towards the radially innermost portion, the sidewall 4 (which is symmetrical to the corresponding sidewall 3) shows four typical zones, namely: a first zone 13, which connects the sidewall to the upper portion of the tire, comprising the tread band 1 and the annular reinforcement 2; a second zone 14 having a relatively small thickness; a third zone 15 having a thickness greater than that of zone 14; and a fourth zone 16 having a thickness comparable with that of zone 14. It can be therefore said that each sidewall comprises a thickened central portion and two portions, indicated with 14 and 16 which, having a thickness smaller than that of the thickened portion, have also a lower bending stiffness. Beyond these portions of relatively low thickness, there are respectively the bead, fitted on the rim, and the end of the inextensible annular structure; and also the bead, like the end of the inextensible structure, can be considered as a fixed point, since it is fitted on the rim, owing to the structural rigidity of the latter.

In the illustrated tire, the ratio between the thickness of the portion 15 and the smaller thickness of the portions 14 and 16 is equal to about 1.78; consequently, since the sidewall is entirely made of the same material and the moduli of elasticity of the two sections are therefore equal to each other, the ratio between the two moments of inertia, being equal to $1.78^3$, corresponds to 5.6, and the ratio between the bending stiffness of the portions 14 and 16 and the bending stiffness of the portion 15 becomes in this case equal to 0.18.

Only by way of non-limiting example, the sidewalls 3 and 4 of the tire illustrated in the figure can be constituted by a rubber compound having a modulus of elasticity of 40 Kg/cm².

The behaviour of the above described tire is as follows.

When air is admitted inside the tire (in the above described example the pressure is of the order of 1.5 ÷ 3 atm) by means of the appropriate valve 10, the pressure of such inflation air normally acts on the inner walls of the sidewalls 3 and 4 of the tire. The effect of such pressure is that of pushing the sidewalls towards the tire outside, reducing in this way the curvature of the respective section midlines 11 and 12. Since — as said above — the bead and the end of the inextensible annular structure behave as points whose distance is substantially invariable, each sidewall, although it is subjected to the indicated pressure, becomes shortened in consequence of the reduction of the camber of its original curvature and is subjected to a compression in its whole section. The resistance or compressive and bending stiffness of the material is such that it does not allow said shortening to achieve the value defined by said distance between said points, so that the sidewalls do not invert the sense of their curvature. Consequently, the sidewalls are subjected to compression; this state of stress is therefore contrary to that existing in known conventional tires.

The shape taken by the tire after its inflation is visible in FIG. 2. As can be noted from said figure, the curvature of the sidewalls has decreased, but maintains the same sense; it is moreover evident that any further movement of the sidewalls, to reduce their curvature, finds a serious obstacle in the presence of the points at an invariable distance, as indicated above, corresponding to the beads and to the lateral ends of the inextensible annular structure, since said movement would result in a further shortening of the sidewalls, stressed to compression and resistant to it.

The advantages offered by the tire according to this invention are many. First of all, the sidewalls do not require the presence of tension-resistant reinforcing structures, and therefore can be obtained by means of a simple pouring or injection molding process, or the like.

This results in economical advantages, due to the possibility of a larger mechanization with respect to the present technique of construction of normal tires and to the greater uniformity of production.

Secondly, owing to the particular configuration of the tire according to the present invention, and in particular of that of its sidewalls, in the event of a puncture, with the consequent drop of pressure, the tire does not collapse completely, but its sidewalls act as pads between the reinforced tread and the rim flanges 8 and 9, supporting, even if at reduced speed and for a relatively short run, the load of the vehicle, without the risk of a complete destruction of the tire and with a better safety for the user.

Moreover, it has been surprisingly ascertained that the radial stiffness of the described tire is independent of its transversal stiffness.

It is well known, that when the inflation pressure in conventional tires is increased, both the radial stiffness and the transversal stiffness are also increased; in other words, these two stiffnesses are correlated to each other and are both dependent on the value of the inflation pressure, so that, if it is wished to increase the transversal stiffness to obtain a better transversal resistance of the tire, it is necessary to accept a reduced comfort.

The stiffnesses of the various parts of the sidewall in the meridian plane can be obtained in several ways; in the tire shown in FIGS. 1 and 2 they are obtained by virtue of particular profiles of the sidewalls, which show variations in thickness.

Figure 3:
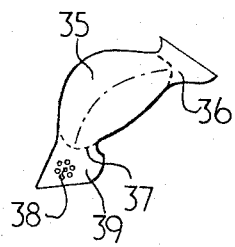
Figure 4:
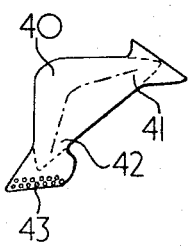
Figure 5:
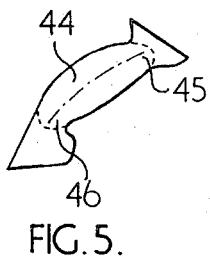

Obviously, the shapes illustrated in FIGS. 1 and 2 are not the only possible ones; FIGS. 3, 4 and 5 represent three alternative embodiments of sidewalls which can be adopted in the tire of FIGS. 1 and 2. More precisely, FIG. 3 illustrates a sidewall, whose central zone 35 is tendentially ovoidal and is connected to the bead and to the end of the annular structure through the two zones 36 and 37 of smaller thickness.

The sidewall illustrated in FIG. 3 is also provided with a bead core 38, positioned in the bead 39, of a type analogous to that used in conventional tires. In this connection, it is also to be noted that, on account of the working under compression of the sidewalls of the tire according to the invention, the presence of circumferentially inextensible reinforcing elements in the bead is unnecessary, contrary to what happens in conventional tires.

FIG. 4 shows a further embodiment of the sidewall, also suitable for the tire of FIGS. 1 and 2, in which the central portion 40 has a tendentially triangular shape and is connected to the end of the inextensible structure and to the bead through the zones of smaller thickness 41 and 42. In this embodiment, instead of using bead cores of known type, provision is made of a structure 43 of annular shape, formed by textile or metallic wires or cords disposed circumferentially side-by-side.

FIG. 5 shows a further embodiment, wherein the central portion 44 has a tendentially elliptical shape and is connected to the end of the annular structure and to the bead through the zones of smaller thickness 45 and 46.

Figure 6:
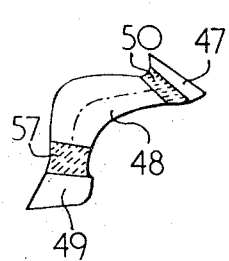

FIG. 6 shows a sidewall of the type of that of FIG. 1, constituted by two compounds having different moduli of elasticity; the compound of the zones 47 and 48, as well as that of the bead 49, has a modulus of elasticity of 60 Kg/cm$^2$, while the compound of the zones 50 and 51 has a modulus of elasticity of 20 Kg/cm$^2$.

Figure 7:
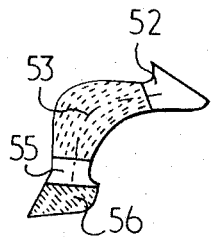

FIG. 7 shows a sidewall of the type of that of FIG. 1, constituted by several compounds; the compound constituting the zone 52 has a modulus of elasticity of 60 Kg/cm$^2$; the compound of the zone 53, in order to increase its compression stiffness, namely to prevent the sidewall from shortening to such an extent as to annul its curvature, contains short glass fibers oriented along a preferred direction; the compound constituting the zone 55 has a modulus of elasticity of 15 Kg/cm$^2$, while the bead 56 is constituted by a compound having a modulus of elasticity of 80 Kg/cm$^2$.

In the embodiment of FIGS. 6 and 7, described above, the difference of bending stiffness between the various zones of the sidewall is greater with respect to that of the sidewalls having an analogous profile and illustrated in FIGS. 1 and 2, since in said embodiments the zones of smaller thickness, namely the zones 50 and 51 of FIG. 6 and zone 55 of FIG. 7, are constituted by a compound having a modulus of elasticity lower than that of the compound forming the surrounding zones.

It is clear that, by appropriately selecting the moduli of the compound forming the various parts of the sidewall, it is also possible to obtain the zones of lower bending stiffness by the simple use of a compound having a low modulus of elasticity, without changing the thicknesses.

It is understood that the above reported examples do not have a limiting character, and that the field of protection of the present invention includes any other alternative embodiment deriving from the above indicated inventive concept. In particular, the above described invention can be applied to any type of tire, having an integral or a removable tread, or having an integral or removable assembling rim.

What is claimed is:

1. A pneumatic tire for vehicle wheels comprising a reinforced tread having a given width and side edges and two sidewalls comprising elastomeric material extending from said tread side edges and terminating in beads for a rigid wheel rim, wherein said given width of the tread is wider than any other part of the tire and is reinforced over substantially the whole of its width by an annular structure which is substantially inextensible under the tire inflation pressure in both its circumferential and lateral directions, said annular structure extending to at least the midline of said sidewalls, and wherein said sidewalls have a cross-sectional shape whose midline over substantially the whole length between the side edges of the tread reinforcement and the bead, is convex with respect to the interior of the tire under the tire inflation pressure, each of said sidewalls having in combination a bending stiffness, curvature and thickness sufficient to constrain the sidewall between said side edges of the inextensible tread reinforcement and the bead seat on the wheel rim whereby on inflation of the tire and under service conditions the sidewalls are placed under compressive stress.

2. The pneumatic tire of claim 1 in which said cross-sectional shape, the ends of the sidewalls adjacent to the side edges of the inextensible annular structure and the beads, respectively, define the vertices of an isosceles trapezium, whose larger base is adjacent to the tread and whose sides are defined by the chords of the curvatures shown by the section midlines of the sidewalls which are wholly internal to the sides of the trapezium.

3. The tire of claim 1, each said sidewall comprising a central zone and end zones and having at least one end zone with a bending stiffness lower than the stiffness of the central zone.

4. The tire of claim 3, wherein the ratio of the lower bending stiffness to the higher one is not in excess of 0.6.

5. The tire of claim 4, said ratio being in the range of 0.6 to 0.01.

6. The tire of claim 3, the variation in bending stiffness resulting from a variation in thickness of a said zone relative to the remainder of said sidewall.

7. The tire of claim 3, the variation in bending stiffness resulting from the fact that a said zone and the remainder of said sidewall are composed of respective materials having different moduli of elasticity.

8. The tire of claim 7, characterized in that said zones of lower bending stiffness are constituted by a compound having a modulus of elasticity, measured at 1/10 of the tensile strength, comprised between 5 and 60 Kg/cm², while the zones of greater bending stiffness are constituted by a compound having a modulus of elasticity, measured at 1/10 of the tensile strength comprised between 20 and 150 Kg/cm².

9. The tire of claim 7, characterized in that said zones of greater bending stiffness are constituted by a compound incorporating short fibers of a material having a modulus of elasticity higher than that of the compound itself.

10. The tire of claim 9, characterized in that said fibers are made of glass and most of them are oriented along a preferred direction.

11. The tire of claim 1, characterized in that said reinforcing structure comprises at least two layers of textile or metallic cords, said cords being crossed to each other, said layers being preferably stiffened at their lateral edges by means of turn-ups of their skirtings, or by means of inextensible strips of cords arranged in the circumferentialy direction of the tire.

12. A pneumatic tire for vehicle wheels comprising a reinforced tread having a given width and side edge zones and two sidewalls having a central zone and end zones comprising elastomeric material extending from the tread side edge zones and terminating in beads for a rigid wheel rim, said side edge zones and said beads defining the end zones of said sidewalls, wherein said given width of the tread is wider than any other part of the tire and is reinforced by an annular structure which is substantially inextensible under the tire inflation pressure in both its circumferential and lateral directions and which extends between said side edge zones, wherein said sidewalls have a cross-sectional shape whose midline over substantially the whole length between the side edge zones of the tread reinforcement and the bead, is convex with respect to the interior of the tire under the tire inflation pressure, each of said sidewalls having in combination a bending stiffness, curvature and thickness sufficient to constrain the sidewall between said side edge zones of the inextensible tread reinforcement and the bead seat on the wheel rim whereby on inflation of the tire and under service conditions the sidewalls are placed under compressive stress, and wherein said sidewalls have at least one end zone with a bending stiffness lower than the stiffness of the central zone.

13. The pneumatic tire of claim 12 having portions adjacent said edges of reduced bending stiffness with respect to the remaining portion of said sidewalls located intermediate said edges and said beads.

14. The pneumatic tire of claim 12 having portions adjacent said beads of reduced bending stiffness with respect to the remaining portion of said sidewalls located intermediate said beads and said edges.

15. The pneumatic tire of claim 12 wherein the annular reinforcing structure of the tread is curved and has its concavity directed towards the interior of the tire.

16. A pneumatic tire for vehicle wheels comprising a tread reinforced over substantially the whole of its width by an annular structure which is substantially inextensible under tire inflation pressure both in its circumferential and lateral directions, said tread being wider than any other part of the tire, beads for engaging bead seats in the wheel rim, and two sidewalls extending in converging relationship from the lateral edges of said tread to said beads and having in cross-section a centerline which is convex towards the interior of the tire under inflation pressure, said sidewalls further having portions adjacent said edges and said beads of reduced bending stiffness with respect to the remaining portion of said sidewalls, said reinforcing annular structure being curved, having its concavity directed towards the interior of the tire, and having a tangent in the zone adjacent each of said sidewalls which makes an angle with the axis of rotation of the tire in the range of 20° to 60°.

* * * * *